March 8, 1966  A. J. SLEMMONS  3,238,913
APPARATUS FOR PROPELLING BUOYANT VEHICLES
Filed Sept. 26, 1963  9 Sheets-Sheet 5
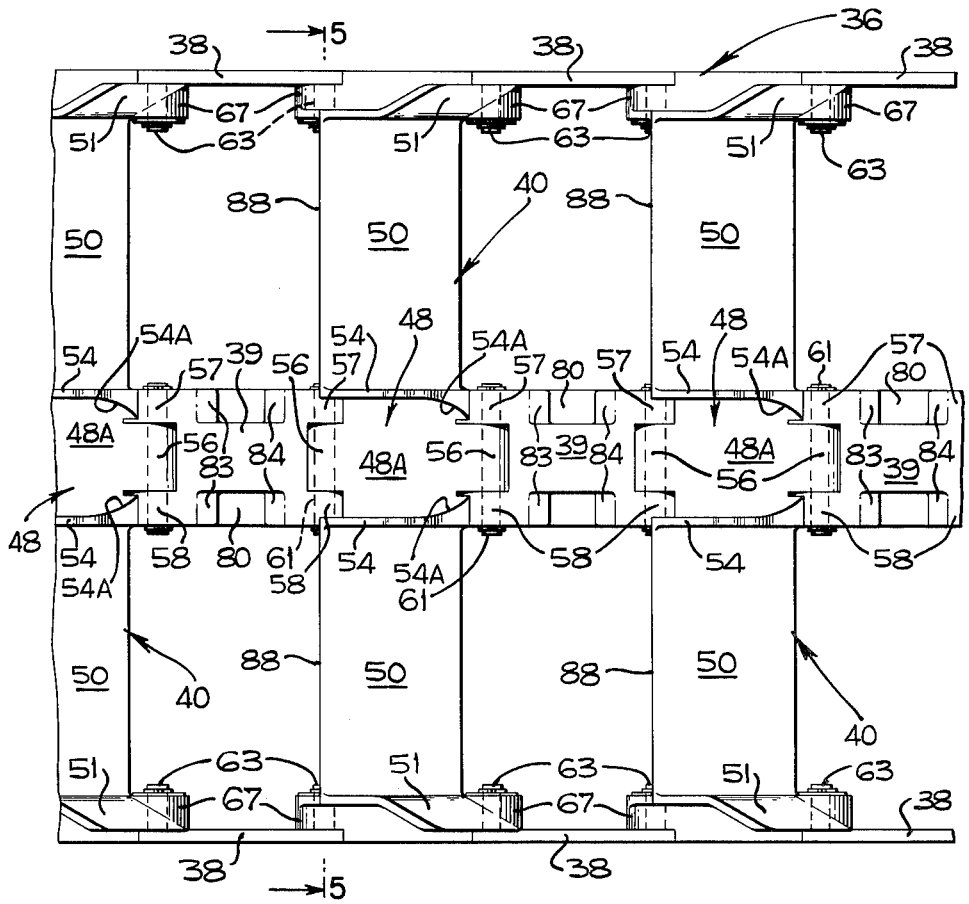
FIG_3
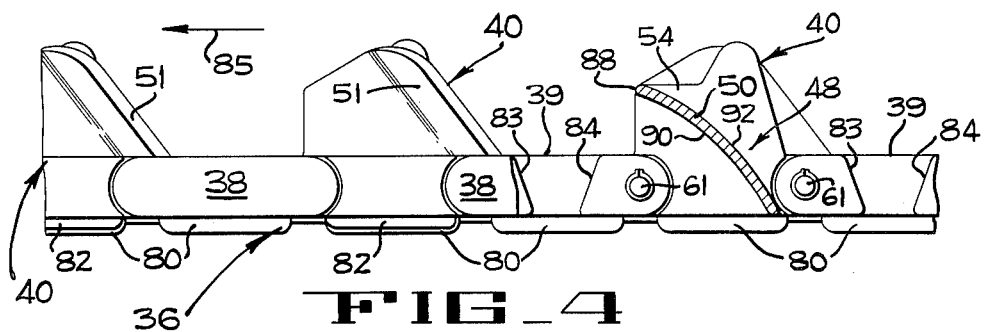
FIG_4
INVENTOR
ARTHUR J. SLEMMONS
BY
ATTORNEY

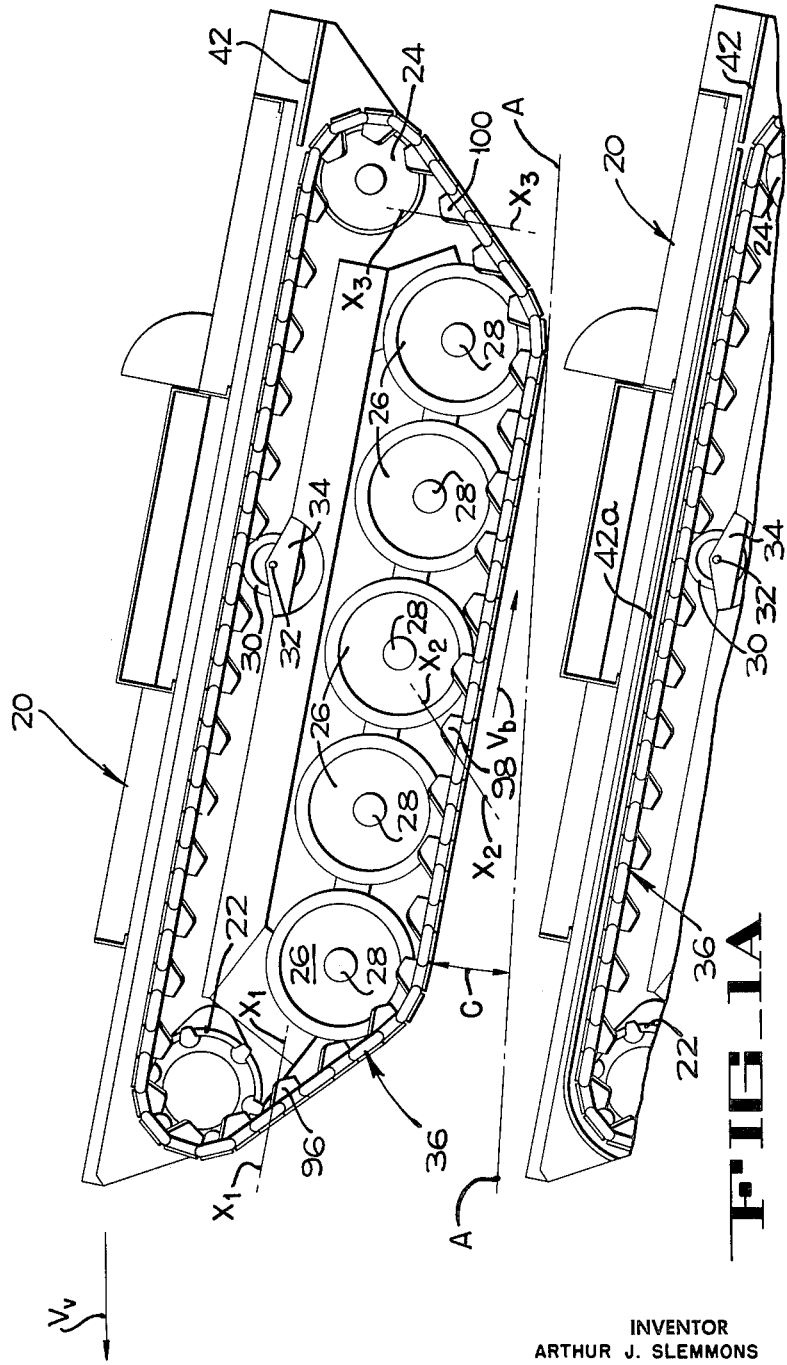

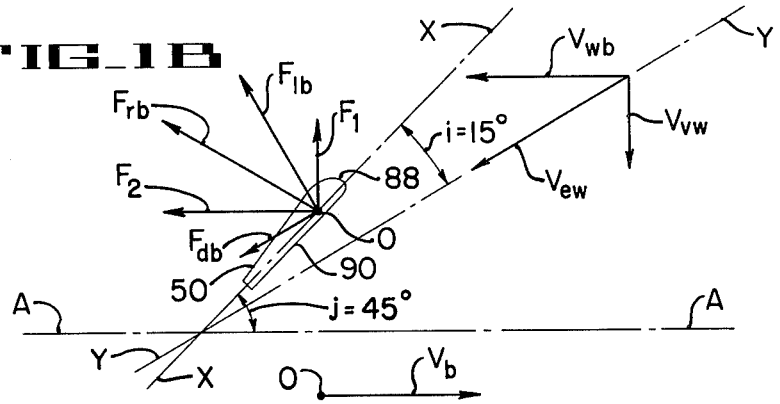
FIG_1B
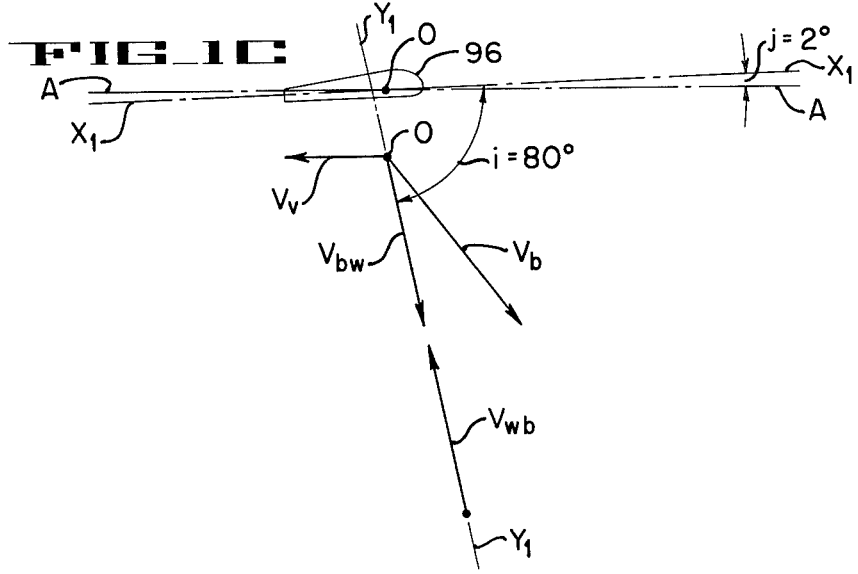
FIG_1C
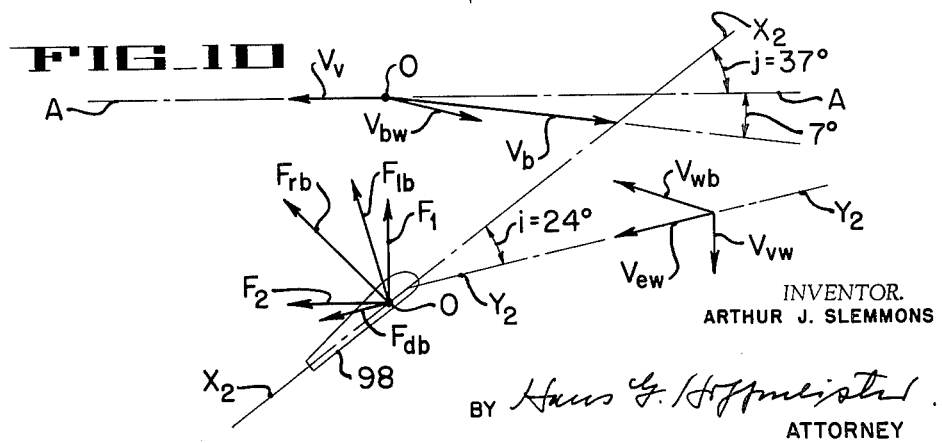
FIG_1D
INVENTOR.
ARTHUR J. SLEMMONS
BY Hans G. Hoffmeister
ATTORNEY

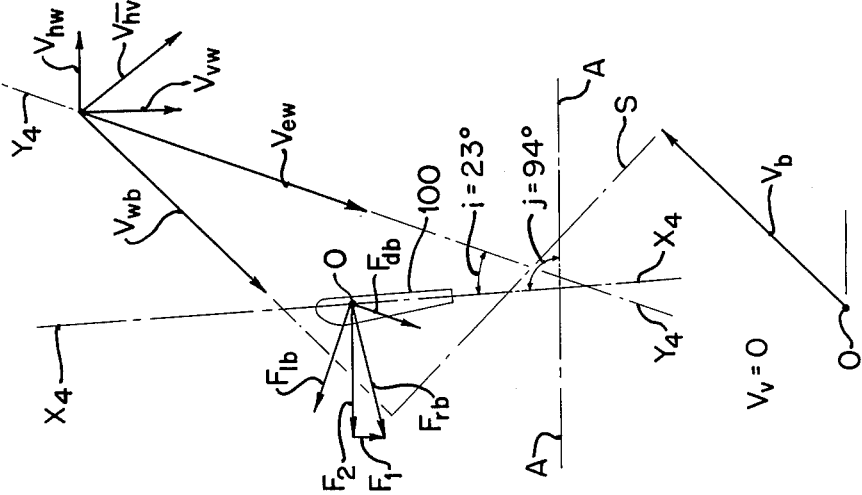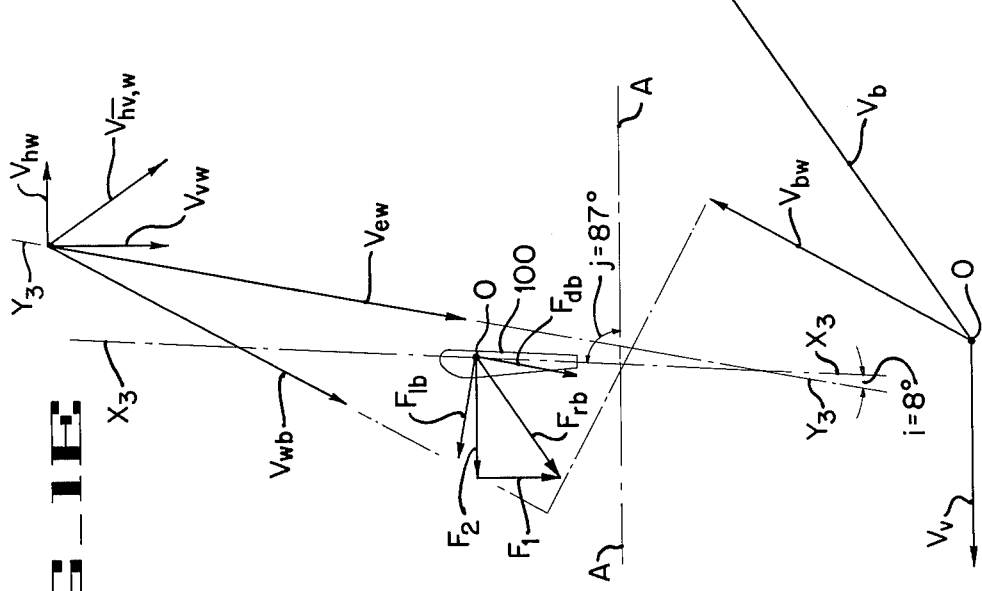

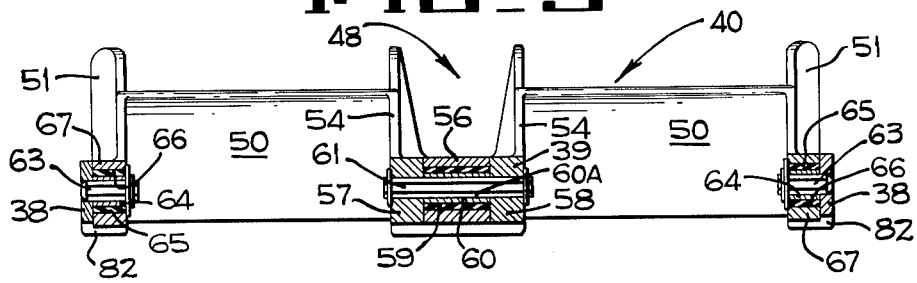
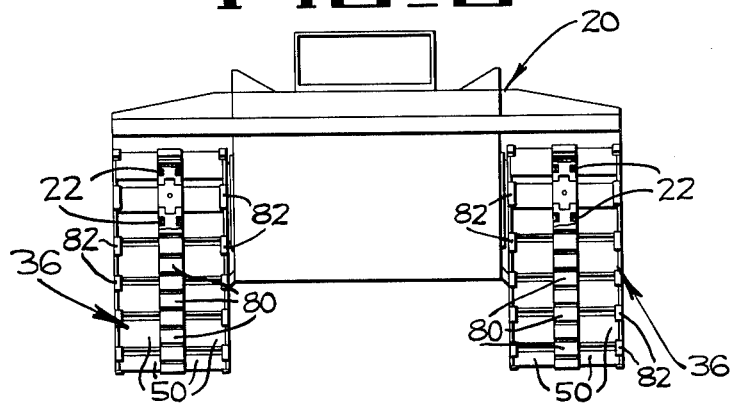
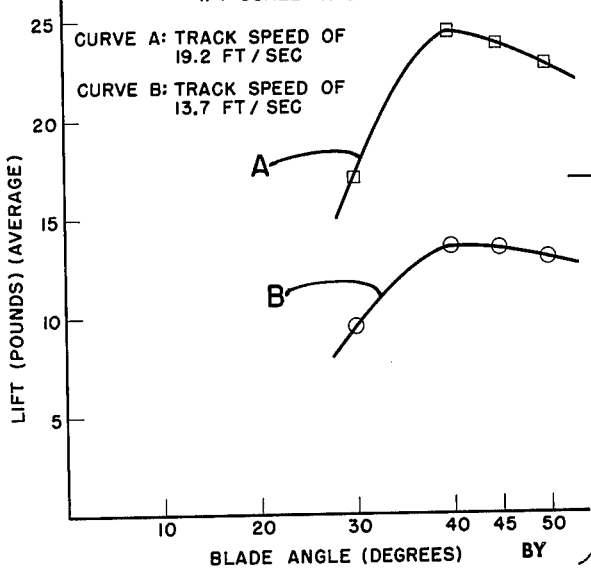

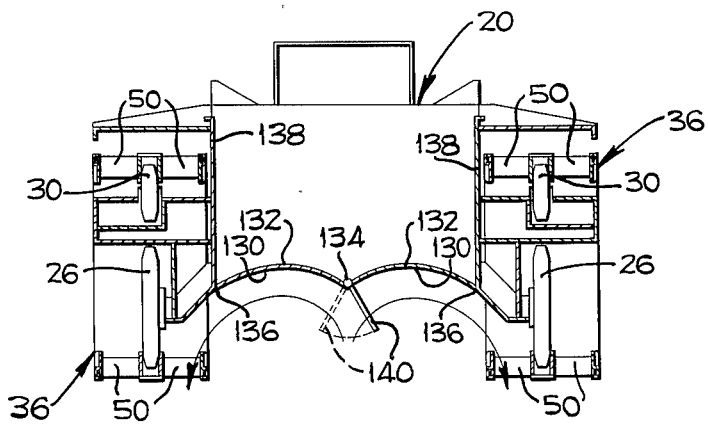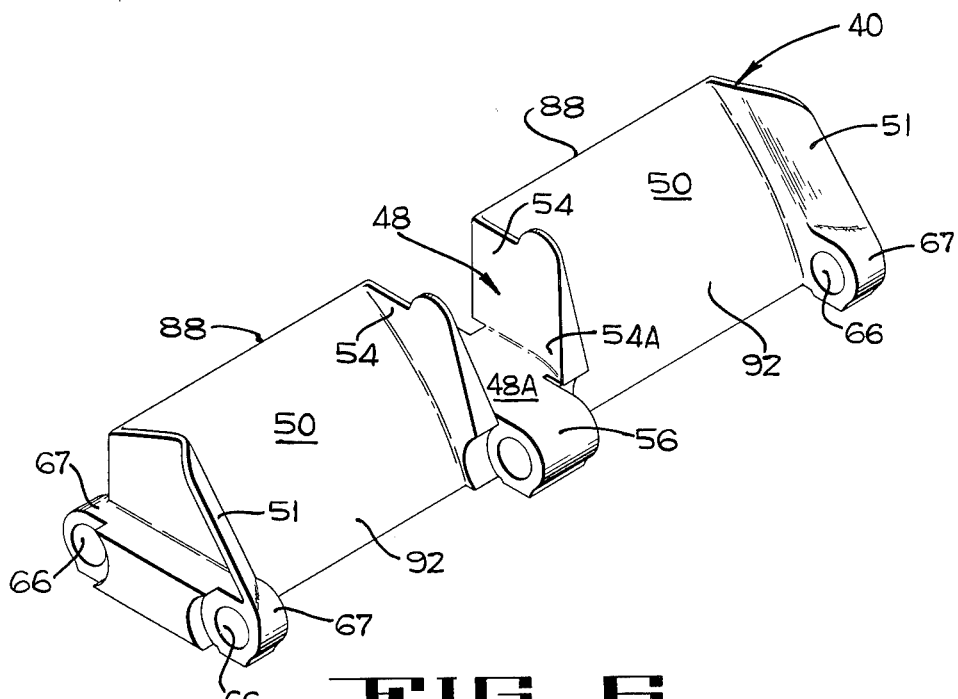

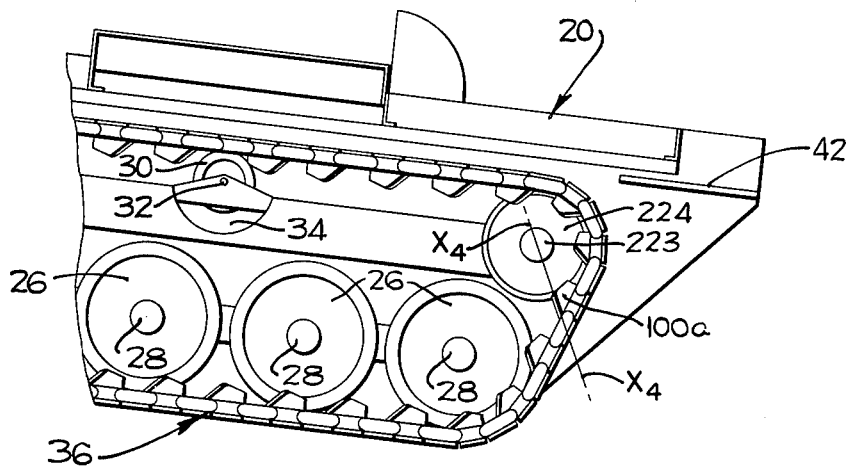
FIG_8
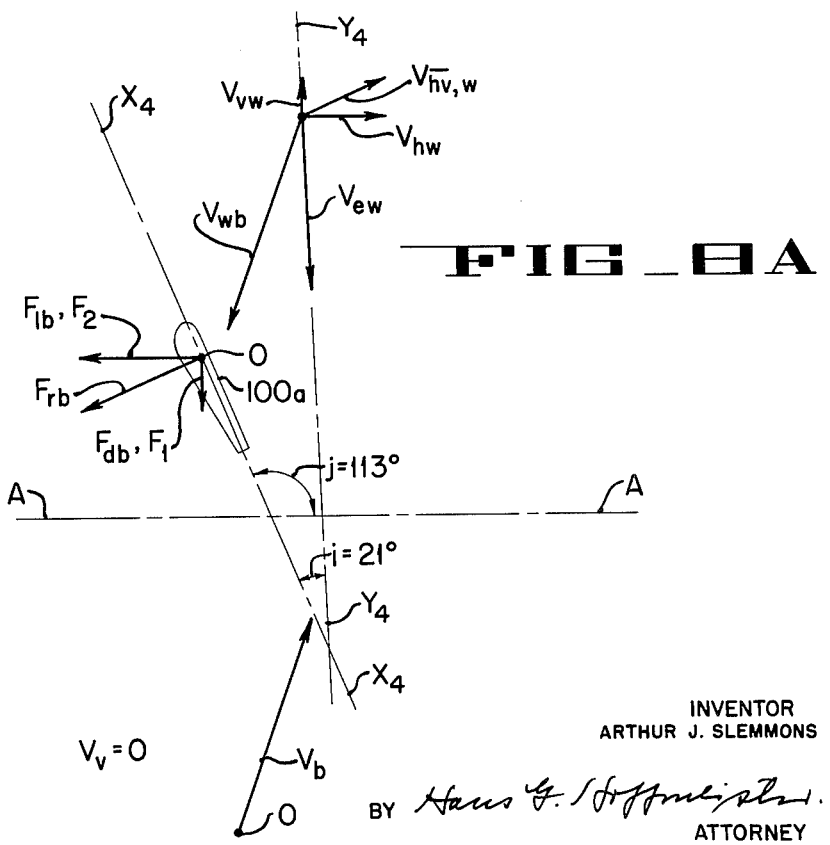
FIG_8A

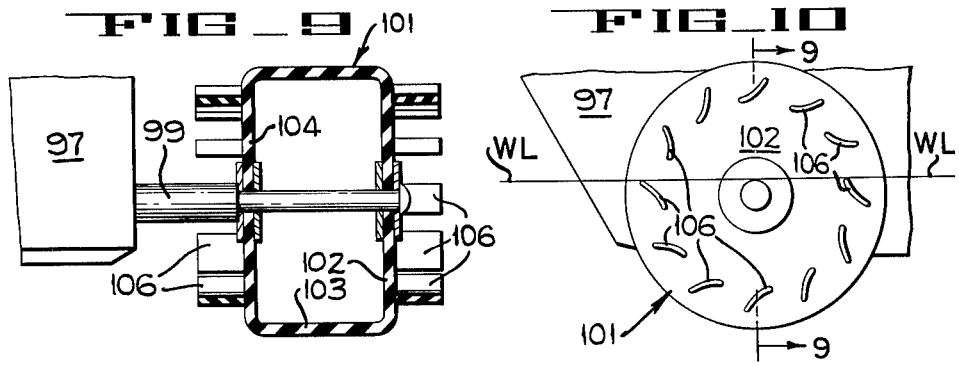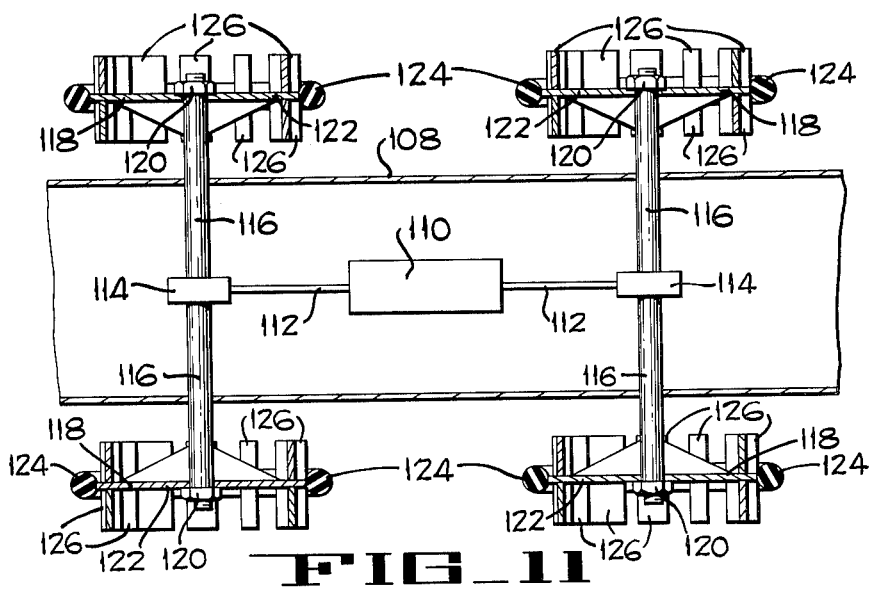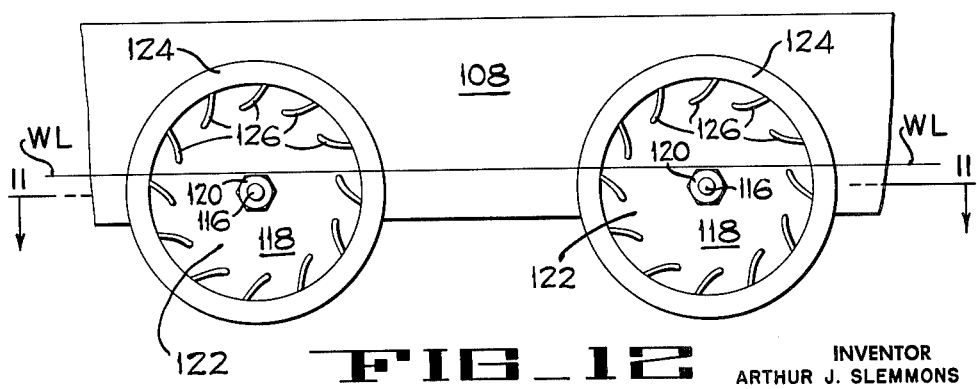

FIG_13
FIG_14
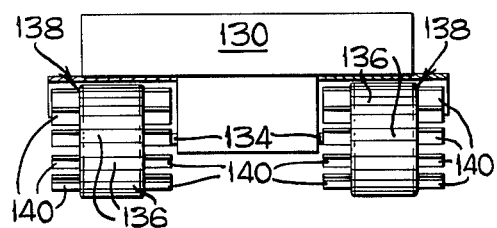
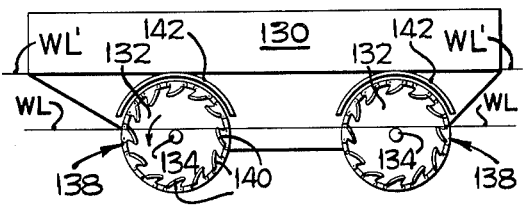
FIG_16
FIG_15
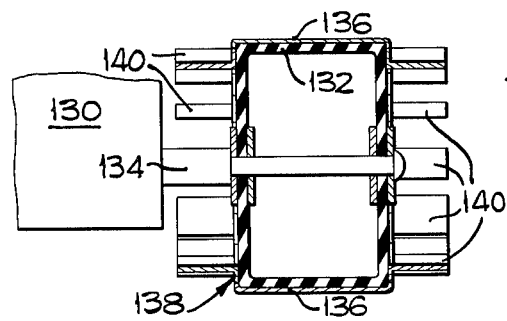
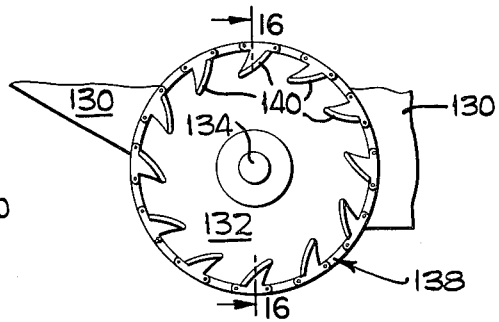
FIG_17
FIG_20
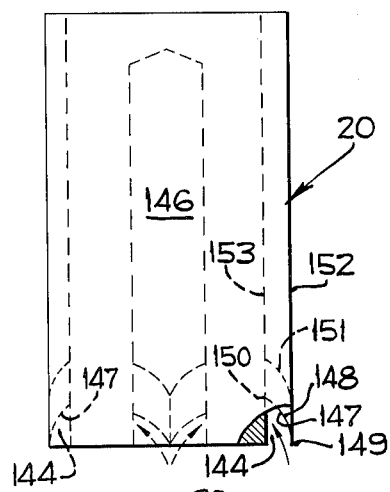
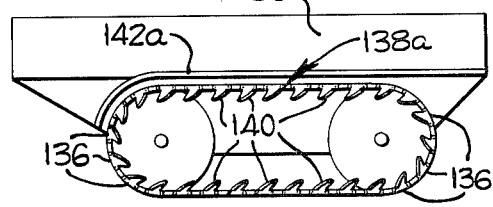
FIG_18
FIG_19
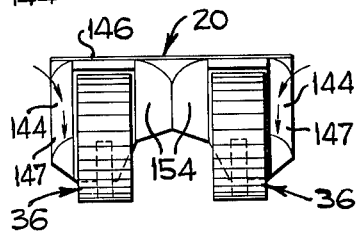
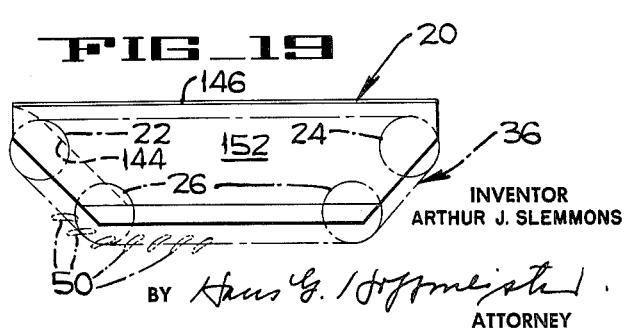
INVENTOR
ARTHUR J. SLEMMONS
BY Hans G. Hoffmeister
ATTORNEY

United States Patent Office 3,238,913
Patented Mar. 8, 1966

3,238,913
APPARATUS FOR PROPELLING BUOYANT VEHICLES
Arthur J. Slemmons, Los Gatos, Calif., assignor to FMC Corporation, San Jose, Calif., a corporation of Delaware
Filed Sept. 26, 1963, Ser. No. 311,695
8 Claims. (Cl. 115—1)

This invention relates to amphibious vehicles and more particularly to hydro-dynamic devices that lift and propel such vehicles in water.

Known amphibious vehicles of the type having endless orbiting tracks that are effective to propel the vehicle over various types of terrain and in water have been largely successful. This invention provides hydrodynamic device that lift and propel the vehicle in water by including hydrofoil blades that are movable relative to the vehicle body and operative to induce lift and thrust froces on the vehicle. In turn, such lift and thrust forces, respectively, raise and propel the vehicle through the water with the lift force being of such a magnitude that the hull of the vehicle is raised partially or totally out of the water and the resistance to motion of the vehicle through the water is greatly reduced.

In certain embodiments of the invention, in addition to lifting the vehicle body, the hydrofoil blades constrain the body to assume a pitch or trim angle, relative to the direction of motion, that tilts the bow upwardly relative to the stern and thus a planing angle is produced that minimizes bow waves and reduces parasitic drag between the vehicle body and the water.

Accordingly, an object of this invention is to provide a new and improved apparatus for propelling buoyant vehicles.

Another object of this invention is to provide a new track for propelling vehicles over land or water with the track being operative to impose a lifting force to the vehicle during propulsion in water.

Another object of this invention is to provide a new track having a formed portion on each link that generates lift and propulsive forces when moved in liquid such as water.

Another object of this invention is to provide a vehicle body that is formed to effect a predetermined pattern of water flow about each endless track associated therewith.

Another object of this invention is to provide hydrofoil elements on selected links of endless tracks that are operable to lift and propel the vehicle associated therewith so that the vehicle is raised and propelled in water.

Another object of this invention is to provide hydrofoils on the wheels of a wheel propelled vehicle.

Another object of this invention is to provide an easily maneuverable hydrofoil track propelled vehicle which controls the motion of the vehicle by selectively restricting the flow of water to either one of the tracks.

In the accompanying drawings there is shown for purposes of illustration one form which the invention may assume in practice.

In the drawings:
FIGURE 1 is a diagrammatic side elevation of the vehicle and the associated track, constructed in accordance with the principles of this invention.
FIGURE 1A is a fragmentary diagrammatic side elevation of a modified form of the vehicle of FIG. 1.
FIGURE 1B is a vector diagram of the force and velocity vectors when the diagrammatically shown hydrofoil blade defines a 45 degree angle with the horizontal A—A and when the blade is moved through the liquid medium with a velocity $V_b$.

FIGURE 1C is a vector diagram of the diagrammatically shown hydrofoil blade during movement thereof from the upper to the lower reach of its orbit.
FIGURE 1D is a vector diagram of the diagrammatically shown hydrofoil blade during movement thereof along the lower or active reach of its orbit.
FIGURE 1E is a vector diagram of the diagrammatically shown hydrofoil blade during movement thereof from the lower to the upper reach of its orbit.
FIGURE 1F is a vector diagram of the diagrammatically shown hydrofoil blade, located on the upcoming portion of the track orbit, upon initial orbital movement of the tracks.
FIGURE 2 is a front elevation of the vehicle shown in FIGURE 1.
FIGURE 3 is an enlarged fragmentary plan of a portion of the track shown in FIGURE 1.
FIGURE 4 is a side elevation of FIGURE 3.
FIGURE 5 is a section taken substantially along the line 5—5 of FIGURE 3.
FIGURE 6 is a perspective of a link of the track that has the hydrofoil blades.
FIGURE 6A is a graph showing the resulting lift plotted against various blade angles.
FIGURE 7 is a diagrammatic transverse section of a vehicle similar to that shown in FIGURE 1 including a pivotally mounted gate which is operable to selectively restrict flow of water to either track.
FIGURE 8 is a fragmentary side elevation of the rearward portion of a vehicle similar to that shown in FIGURE 1 in which the upcoming run of the track has a larger angle of inclination.
FIGURE 8A is a vector diagram of the force and velocity vectors of the hydrofoil blades during movement thereof from the lower to the upper reach of FIG. 8.
FIGURE 9 is a diagrammatic fragmentary of a wheeled vehicle body showing one of the wheels in section taken along the line 9—9 of FIGURE 10.
FIGURE 10 is a side elevation of FIGURE 9.
FIGURE 11 is a diagrammatic fragmentary longitudinal section along the line 11—11 of FIGURE 12 of a wheeled vehicle, particularly showing another application of the hydrofoil blades of the present invention.
FIGURE 12 is a partial side elevation of the vehicle shown in FIGURE 11.
FIGURE 13 is a diagrammatic front elevation of another wheel propelled vehicle showing each of the wheel treads embraced by a chain having axially extending hydrofoil blades.
FIGURE 14 is a diagrammatic side elevation of FIGURE 13.
FIGURE 15 is an enlarged side elevation of one of the wheels of FIGURE 14.
FIGURE 16 is an enlarged section of one wheel of FIGURE 14 taken substantially along the line 16—16 of FIGURE 15.
FIGURES 17, 18 and 19 are, respectively plan, front, and side elevations of another embodiment of the vehicle body shown in FIGURE 1.
FIGURE 20 is a diagrammatic side elevation of another embodiment of the hydrofoil vehicle of the present invention.

Referring now to FIGURES 1 and 2 there is shown a vehicle body 20 constructed and arranged to be buoyant and water tight. Laterally aligned driving sprockets 22 are rotatably mounted at the forward portion of the body, and similarly transversely aligned idler wheels 24 are rotatably mounted at the rearward end of the body. Groups of longitudinally spaced bogie wheels 26 are rotatably mounted at each side of the vehicle on shafts 28 which are in turn secured to the body 20. A bracket 34 is rigidly secured to each side of the body 20 and supports a shaft 32 upon which an idler wheel 30 is rotatably mounted. The vehicle is propelled on land or in the water by a pair of hydrofoil tracks 36 (FIG. 2) each of which moves in an orbit defined by the sprocket 22, the bogie wheels 26, the idler wheel 24, and the idler wheel 30. A baffle vane 42, secured to the rearward end of the body 20 and co-extensive with the width of the adjacent track 36, is provided for intercepting the upward water spray produced by each track and thus, in part, preclude water from entering the interior of the body 20. The angle C, defined by the lower reach of the tracks 36 and the horizontal A—A, represents the attitude the vehicle assumes during forward movement in water.

Since each track or crawler tread 36 is constructed of similarly formed pivotally connected links, only a portion of one of the crawler chains 36 will be shown and described in detail. As shown in FIGURES 3–6, each crawler chain comprises a plurality of regularly spaced transverse propelling members 40 that are pivotally interconnected at their ends by rigid links 38 and at their center by a drive link 39. Each of the members 40 (FIG. 6) is a rigid, one-piece member and has a central portion 48, a hydrofoil blade 50 on each side of the central portion 48 and a formed plate-like shroud 51 at the outboard end of each blade 50. The central portion 48 has a flat surface 48a, upon which the periphery of the bogie wheels 26 roll, and upwardly extending walls 54 that have downwardly and inwardly converging surfaces 54a which provide guides for the bogie wheels to ensure proper training of each crawler track 36.

The central portion 48 of the member 40 has a boss 56 at each end. Each boss 56 fits between a pair of bosses 57 and 58 (FIG. 3) on the adjacent drive link 39 so that the bores in the three bosses are in alignment, the bore in boss 56 being larger than the bores in bosses 57 and 58 as seen in FIG. 5. A rubber torsion bushing 59 is secured by a suitable adhesive to the inner wall of the bore in boss 56 and is fused on a sleeve 60 which has a central bore 60a of hexagonal cross-section. A pin 61 of hexagonal cross-section extends through bore 60a and through bores in the bosses 57 and 58 which are also hexagonal in cross-section. Snap-rings are disposed on the ends of pin 61 to hold it in place.

Each of the links 38, which pivotally connect the ends of adjacent propelling members 40, has a bore in which a pin 63 of hexagonal cross-section is welded. The pin 63 extends through the hexagonal bore of a sleeve 64 to which a rubber torsion bushing 65 is fused, the outer surface of the bushing being secured by a suitable adhesive to the inner wall of a bore 66 in a boss 67 formed on the propelling member 40.

A renewable track pad 80 (FIG. 4) is secured, as by bolting, to the undersurface of each drive link 39 and to the undersurface of the central portion 48 of each propelling member 40. Similarly, an end pad 82 is removably secured to each end of member 40. Each drive link 39 has two recesses formed by oppositely inclined walls 83 and 84, each recess being adapted to receive the teeth of one of the two sprocket wheels formed on the drive sprocket 22.

Each hydrofoil blade 50 has a shape that is consistent with accepted hydrodynamic theory and practice wherein its attitude, relative to the direction of water flow, and its shape is effective in maximizing the lift force and in reducing flow discontinuities about each of the blades. As seen in FIG. 4, the blades in the lower run of the chain move in the direction of arrow 85. To this end each blade has a rounded leading edge 88 defined by the inner and outer generally parallel arcuate surfaces 90 and 92. The water inlet passageway to the blades is defined by the distance between adjacent leading ends 88 and the length of each blade between the triangular wall 54 and the shrouds 51. In the preferred embodiment each of the blades 50 are disposed at an angle of approximately 45 degrees with respect to the horizontal. It has been found that such a large angle of incidence does not give rise to stall conditions since the disclosed hydrofoil track is functionally comparable to axial flow hydrodynamic impeller pumps with the exception that instead of the impellers travelling a circle they are travelling in a straight line, thus defining a radius of infinite length.

In order to facilitate description of the hydrodynamic forces that are produce by the blades 50, it will be assumed that one of the links 40 is being moved through still water in a horizontal plane so that the angle of attack of the blades 50 are at approximately 45 degrees, with the horizontal, as shown by the angle that the reference line X—X in FIG. 1B makes with the horizontal A—A. The center of lift of the blade is represented by the dot O and the velocity of the blade is represented by the vector $V_b$ which for purpose of clarity is shown initiating from the downwardly displaced dot O. Movement of the blade through the water in the direction and in the attitude shown causes the water that is in a projected area of the surface 90 to be induced downwardly as shown by the velocity vector $V_{vw}$. Since the blade is moving with a velocity $V_b$, the water has a relative velocity vector in the opposite direction, and of equal magnitude, which is represented by the vector $V_{wb}$. The resultant velocity of the water relative to the leading edge 88 is represented by the resultant velocity vector $V_{ew}$, located coincident with reference line Y—Y and defining an angle of incidence $i$ of approximately 15° with the line X—X. As the water traverses the inner surface of the blade 90 forces $F_{1b}$, $F_{db}$, the lift and drag forces respectively, are imposed on the blade and act in directions normal and coincident with the direction of the velocity vector $V_{ew}$. Vector addition of $F_{1b}$ and $F_{db}$ yield a resultant force $F_{rb}$ which in turn is resolved into its vertical and horizontal components $F_1$ and $F_2$ respectively. The forces $F_1$ and $F_2$ are the component forces of $F_{rb}$ which are effective to lift and retard movement of the blade 50 through the water. Therefore it is to be appreciated that during orbital movement of the crawler tread 36 each of the submerged blades 50, particularly the ones which are momentarily located between the forward and rearward bogie wheels 26, contribute to lift and propel the vehicle body 20 through the water since the direction of the horizontal component $F_2$ is in the direction of vehicle motion.

Orbital movement of the crawler treads 36 changes the attitude of each blade 50 relative to the direction of movement of the vehicle body 20. When any one of the propelling members 40 is located between the driving sprocket 22 and the nearest bogie wheel 26, the associated blade 50 is substantially horizontal; when the links 40 are located between the forward and rearward bogie wheels the blades 50 assume an angle of approximately 45 degrees; and when the links 40 are located between the rearwardmost bogie wheel and the idler wheel 24 the blades 50 assume a substantially verticle orientation.

Referring to FIGURE 1, selected links 96, 98 and 100 respectively, on the downcoming portion of the track, the lower run of the track and the upcoming portion of the track, will be individually described with relation to the velocity and force vectors that result when the vehicle is being propelled in water at a constant speed. Referring now to FIGURE 1C, a free body diagram of the blade 96 is illustrated having a velocity $V_b$, relative to the vehicle body 20, and a velocity $V_v$ which is the translational velocity of the vehicle body 20. The resultant of these two velocity vectors is $V_{bw}$, which is the velocity of the blade relative to the water. The center of lift of the blade 96 is represented by the dot O, and line $X_1$—$X_1$ containing the center of lift is located at an angle $j$, which is approximately 2 degrees above the horizontal plane A—A. The instantaneous velocity diagram for the water includes the vector $V_{wb}$ which is equal and opposite in direction to the vector $V_{bw}$. It is assumed that the vehicle is moving in still water; therefore no horizontal component of water velocity is present when the blades are entering the water. The reference line $Y_1-Y_1$, is drawn coincident with the vector $V_{wb}$ and it intersects the $X_1-X_1$ line at an angle of approximately 80 degrees which is the angle of incidence $i$ of the water relative to the blade. This very large angle of incidence, and the fact that the blades are following each other causes "channeling" of the water which produces a great amount of turbulance and discontinuity in flow. Therefore when the blades traverse the downcoming portion of the orbit no lift or thrust forces of any practical consequence are imparted to the vehicle.

FIGURE 1D shows the hydrodynamic action of the blade 98 which is on the lower run of the orbit. The blade defines an angle $j$ equal to approximately 37 degrees relative to the horizontal A—A. An axis $X_2-X_2$ contains the centroid O of the blade. The blade 98 is moving at a velocity $V_b$ relative to the vehicle body 20 and the vehicle body 20 is again moving at the velocity $V_v$. The resulting velocity vector of the blade relative to still water is shown by the velocity vector $V_{bw}$. In turn, the velocity of still water relative to the blade, illustrated by the velocity vector $V_{wb}$, is equal in magnitude and opposite in direction to the velocity vector $V_{bw}$. Due to the attitude of the blade 98 relative to the horizonal A—A the water is induced downwardly in the direction and magnitude shown by the vertical velocity vector $V_{vw}$. Vector addition of the vectors $V_{wb}$ and $V_{vw}$ yields $V_{ew}$ which is the resultant velocity of the water relative to the moving blade. The resultant velocity vector $V_{ew}$ defines an angle of incidence $i$ of approximately 24 degrees taken between the reference axes $X_2-X_2$ and $Y_2-Y_2$. The water that is acted upon by the blade gives rise to lift and drag forces $F_{lb}$ and $F_{db}$ whose vector addition yields a resultant $F_{rb}$ shown to originate at the center of lift O of the blade 98. The magnitude and direction of the lift and drag force on the vehicle are found by resolving the resultant $F_{rb}$ into its vertical and horizontal components $F_1$ and $F_2$. The resultant force $F_{rb}$ represents the hydrodynamic forces acting on the blade and the resultant force is substantially equal in magnitude, and opposite in direction, to the rate of change of momentum imparted to the water by the moving blade.

In FIG. 1D it should be noted that the velocity vector $V_b$ defines an angle of approximately 7° with the horizontal A—A. This angle will be hereinafter referred to as the trim angle. The magnitude of the trim angle is a result of the sum of the lift and drag forces of the blade, the force of gravity, the buoyancy forces, and hydrodynamic forces on the hull. It is to be appreciated that the magnitude of the trim angle depends on many factors, the most salient of which are the number of blades 50, the position of the center of gravity of the vehicle body relative to the blade orbit, and the speed at which the tracks 36 are orbited.

Referring now to FIGURE 1E, there is shown the blade 100 which is instantaneously located between the rearwardmost bogie wheel 26 and the idler wheel 24. In this position the blade 100 assumes an angle $j$ of approximately 87 degrees with the horizontal A—A. Here again, the centroid of the blade is shown in two positions, on the blade, and at the origin of the velocity vectors of the blade and the vehicle. The velocity of the blade relative to the vehicle body $V_b$, and the velocity vector of the vehicle $V_v$, are added vectorially and yield the velocity of the blade relative to still water $V_{bw}$. The velocity diagram for the water is above the blade and displaced toward the $X_3-X_3$ axis so that the intersection of the $X_3-X_3$ axis and the $Y_3-Y_3$ axis is located within the confines of the sheet of drawing. The velocity of still water relative to the blade $V_{wb}$ is equal to and opposite in direction to the velocity vector of the blade $V_{bw}$. Since the blade is moving upwardly and to the right relative to the water, the induced component velocities of the water are $V_{hw}$ and $V_{vw}$, respectively, the horizontal and vertical component, which when added vectorially yield the resultant vector $V_{\overline{hv},w}$. Vector addition of $V_{\overline{hv},w}$ and $V_{wb}$ yield the vector $V_{ew}$ which is the resultant velocity vector of the water relative to the blade. The axis $X_3-X_3$, containing the centroid of blade, and the axis $Y_3-Y_3$ coincident with the vector $V_{ew}$, intersect at an angle of approximately 8 degrees which defines the angle of incidence $i$ of the water relative to the blade 100. The energy imparted to the water by the moving blade imposes reaction force on the blade 100 shown to be acting through the centroid O. These drag and lift forces $F_{db}$ and $F_{1b}$, respectively, when added vectorially yield the resultant $F_{rb}$ which in turn is resolved into vertical and horizontal components $F_1$ and $F_2$ respectively. The horizontal component is effective to propel the vehicle 20 in its direction of motion $V_v$ and the vertical component is effective to impose a turning moment on the vehicle in a clockwise direction (as viewed in FIGURE 1) thus assisting in raising the bow or forward end of the body 20 relative to the rearward end.

Referring to FIGURE 1, it will be noted that each track has a lower run long enough to accommodate eleven of the links 40 with each link including two transversely aligned blades 50. Therefore, the total sum of the blades on both tracks producing lift and drag forces respectively $F_1$ $F_2$, are forty-four. It is to be appreciated that changes in the number of blades on the lower run of the tracks can be effected without departing from the basic concept of this invention.

Assuming now that it is desired to propel the vehicle from a standing position while it is floating in still water the action of the blade 100 at the instant when the crawler treads 36 are orbited, produces the velocity and force diagrams shown in FIGURE 1F. The vector diagram assumes that the vehicle is in a horizontal position, thus at a zero degree trim angle, orienting the blade 100 at an angle $j$ equal to 94 degrees with respect to the horizontal plane A—A. Under these conditions the velocity of the vehicle $V_v$ equals zero and the link associated with the blade 100 is moving at a velocity of $V_b$ defining an angle of approximately 46 degrees with the horizontal. The construction line S denotes that the velocity diagram of the water is shifted laterally and upwardly so that the intersection between the axes $X_4-X_4$ and $Y_4-Y_4$ is within the confines of the drawing. The velocity diagram for the water immediately after the tracks commence orbital movement includes the horizontal and vertical component velocities $V_{hw}$ and $V_{vw}$, whose resultant is $V_{\overline{hv},w}$. The velocity of still water relative to the blade velocity $V_b$ is represented by the vector $V_{wb}$ which is equal and opposite to $V_b$. Vector addition of $V_{\overline{hv},w}$ and $V_{wb}$ yields $V_{ew}$, the entrance velocity of the water relative to the blade. The angle of incidence $i$ is approximately equal to 23 degrees. The drag and lift forces, $F_{db}$ and $F_{1b}$, respectively, produced by the moving blade yield a resultant force $F_{rb}$ acting downwardly and to the left. Resolution of $F_{rb}$ into its vertical and horizontal component yields $F_1$, directed downwardly, and $F_2$, directed to the left.

It is to be noted that the lift force $F_1$ is acting in a downward direction and is of greatly reduced magnitude as compared to force $F_{1b}$. This direction of the lift force acts to lower the rearward end of the vehicle until the axis $X_4-X_4$ is oriented vertically. It should also be noted that the drag force $F_2$ is of greatly increased magnitude and acting in the direction of impending vehicle motion and, therefore, contributes mainly to the acceleration of the vehicle from a standing start. When the vehicle reaches the desired forward speed, the forward end of the vehicle is tipped upwardly relative to the surface of the water and the conditions indicated in the vector diagrams, having the trim angle of approximately 7 degrees, as shown in FIGS. 1C, 1D, and 1E, obtain. The nominal trim angle of 7 degrees was chosen for purposes of illustration and description only since the trim angle, depends on many factors such as blade design, track speed, vehicle loading, vehicle body design, and the relative direction and velocity of the body of water, just to mention a few.

The total lift force developed by each of the crawler treads 36 is sufficient to lift the entire vehicle upwardly so that the upper reach of the crawler tread 36 is substantially above the water line, thus completely eliminating hydrodynamic forces opposing the lift and motion of the vehicle at least during steady state operation thereof in water. The profile drag on the vehicle is also greatly reduced. The trim angle, or attitude of the vehicle in water, takes the bow out of the water, and minimizes the excessive bow wave resistance, flow problems, and limitations to speed due to the tendency of the bow wave to come over the bow. The trim angle also provides lift from the bottom of the body 10. The only limitation to speed is how fast the track can be orbited and the horsepower available.

A one-quarter scale model of one of the crawler treads 36 was made to evaluate the practical feasibility of the disclosed concept and it was tested in a model basin. Part of the testing program involved determining the total lift in pounds against the angle at which the blades 50 were set while the vehicle was restrained from horizontal motion. As shown in FIGURE 6A two curves were developed, each one being run at a constant track speed. The lower curve resulted when the track was orbited at 13.7 feet per second and the upper curve with track being orbited at 19.2 feet per second. Each curve shows that the maximum lift at each speed was attained when the blade 50 was disposed at an angle of 40 degrees relative to the horizontal. With the blades 50 set at 45 degrees the lift at track speeds of 19.2 feet per second amounted to 24 pounds which represented 77 percent of the displacement weight of the vehicle scale model. Consequently, the lift produced by crawler treads made in accordance with this invention are clearly sufficient to raise the vehicle upwardly relative to the water line and to such a significant extent that the forward sprocket wheel 22 and the entire upper run of the crawler tread 36 were above the water line.

A modification which may be incorporated on the vehicle shown in FIGURE 1A includes elongated baffles 42a having one longitudinal edge of each baffle secured to the side walls of the body and located upwardly closely adacent the upper run of each track 36 so as to extend laterally outwardly in the projected area of the upper run. The baffles 42a may be longitudinally closely adjacent the baffles 42 and may be made from a single plate. When such baffles are provided, the upward movement of the water pumped upward by the moving cascade of blades 50 is prevented and thus no appreciable downward force is imposed on the body 20. As shown, the forward portion of each baffle 42a is arcuate and generally concentric with the periphery of the sprocket 22 forming an arcuate passageway through which the water that is entrained by the blade 50 is deflected downwardly thereby preventing pumping of water forwardly. If desired, the baffles 42a may be located closely adjacent and below the upper run of each track 36.

Referring now to FIG. 7, there is shown a modification of the vehicle body 20 wherein like numerals designate the same elements described in connection with FIG. 1. The illustrated modification provides a particular shape to the bottom of the vehicle body between the tracks 36 which promotes increased water flow to the blades 50 that are located closer to the longitudinal median of the body 20 and imposes a predetermined flow pattern to the water prior to being induced downwardly, as shown by the curved arrows. The bottom of the body is formed with longitudinally coextensive, transversely adjacent arcuate channels 130 formed by curved plates 132 that are joined together at 134 defining a rectilinear longitudinal bead. The opposite respective ends 136 are secured to the side plates 138. A downwardly extending plate 139 is pivotally connected at the bead 134 and is selectively adjustable to assume the full line, the dotted line, or a vertical position. The plate 139 fulfills the function of a restrictor valve since its full line position reduces the flow rate of water to the inside portion of the right track, as viewed in FIG. 7. Similarly its dotted position reduces the flow rate of water to the inside portion of the left track.

During orbital movement of the tracks 36 the pumping action of the blades 50, particularly the one located on the lower active run of the orbit, produce downward flow of water as shown by the arrows in FIG. 7. The curved plates 132 provide a smooth entrance channel for the water induced by the respective inner rows of blades, reducing abrupt changes in the direction of water flow and thus effecting a corresponding reduction to flow resistance to the inlet of the inner rows of blades. Location of the plate 139 at its illustrated full line position reduces the flow rate to the inside portion of the right track, accordingly reducing the lift and propulsion forces produced by this track. Concurrently the water flow rate to the left hand track is increased effecting corresponding increases in the lift and propulsion forces produced by this track. The vehicle body 20 would therefore tilt approximately about its longitudinal median in a clockwise direction, as viewed in FIG. 7, and the vehicle will describe a roll about its fore and aft axis and yaw about a vertical axis, said roll and yaw being caused respectively, by the relative difference in lift forces and the relative difference in propulsive forces between the left and the right track. Thus the pivotal plate 139 controls the motion of the vehicle body 20. It is to be appreciated that the body construction shown in FIG. 7 can be utilized without the pivotal plate 139 and the body construction shown in FIGS. 1 and 2 can incorporate the pivotal plate on the flat bottom of the body.

FIGURE 8 shows a modification of the vehicle shown in FIGS. 1 and 2 wherein like numerals refer to the same structure shown in FIGURES 1 and 2. The inclination of the upcoming run of the track 36 is increased relative to the horizontal by locating the shaft 223 for each idler wheel 224 (corresponding to idler 24 of FIGURES 1 and 2) forwardly relative to the last adjacent bogie wheel shaft 28. In this manner the angle which the hydrodynamic blades 50 define relative to the horizontal is accordingly increased, increasing the angle of incidence between the axis $X_4$—$X_4$ and $Y_4$—$Y_4$, as shown in FIGURE 8A. Such a change in the angle of incidence gives a greater propulsive force. In FIGURE 8A, a diagrammatic representation of blade 100a is shown having an angle of inclination $j$ of approximately 113 degrees with the reference plane A—A. Upon initial orbital movement of the tracks 36, no forward velocity of the vehicle takes place and thus the velocity vector $V_v$ is equal to zero. The track velocity is represented by the velocity vector $V_b$ and the velocity of the water relative to the blade is equal and opposite to $V_b$ and is shown by the vector $V_{wb}$. The moving blade imparts vertical and horizontal component velocities to the water $V_{vw}$ and $V_{hw}$ respectively, which yield the resultant velocity $V_{\overline{hv},w}$. Vector addition of $V_{wb}$ and $V_{\overline{hv},w}$ yield $V_{ew}$, the entrance velocity of the water relative to the moving blade 100a. The axes $X_4$—$X_4$ and $Y_4$—$Y_4$ intersect and define an angle of incidence $i$ equal to approximately 21 degrees. The force vector diagram, shown originating from the centroid O of the blade 100a, include a drag force $F_{db}$, for all practical purposes substantially equal to the force vector $F_1$, and a propulsion force $F_{1b}$, which is also substantially equal to the force vector $F_2$. Vector addition of $F_{db}$ and $F_{1b}$ yield $F_{rb}$, the resultant of the external hydrodynamic force acting on the blade 100a. It is seen therefore that the embodiment of FIGURE 8 increases the rate of acceleration of the vehicle body 20 from a standing start in water by increasing the angle of attack of the blade which effects a corresponding increase in the force vector acting in the direction of impending vehicle motion.

The inventive concept of this invention is applicable to wheel propelled vehicles and examples of its application to such vehicles is shown in FIGS. 9–19. Considering FIGURES 9 and 10 first, there is shown a fragmentary portion of a buoyant body 97 having an outwardly extending powered shaft or axle 99 and a low pressure bag-type wheel 101 secured to the shaft 99 in any suitable manner. The wheel 101 includes an outer annular side wall 102, a ground engaging tread portion 103, and an inner annular side wall 104. Each of the side walls have outwardly axial extending circumferentially spaced hydrofoil blades 106 made of the same material as the wheel 101 and molded integral to each of the side walls in cantilever fashion. When the vehicle body 97 is at rest in water, the water line may assume a position shown by the line WL—WL. It will be noted, therefore, that approximately 40 percent of the blades 106 are above the water line, and therefore, do not contribute to the lift or the propulsion of the vehicle through the water, and do not retard the vehicle's advance through the water since the blades extending above the water line may be considered analogous to the upper run of the crawler track 36 described hereinabove with respect to the embodiment of FIG. 1. Rotation of the wheels 101 causes the blades 106 to be moved relative to the water and such movement produces hydrodynamic forces on each of the blades which are effective to cause propulsion and lift of the vehicle in the water based upon the above described principles.

Now, referring to FIGURES 11 and 12, a buoyant vehicle body 108 is shown including a prime mover 110 and output shafts 112 that provide transmission of power to gear boxes 114. Each of the gear boxes 114 is operative to rotate shafts 116 in the same direction to turn wheels 118, which are rigidly secured to the shafts 116 in any suitable manner as by nuts 120. The illustrated wheels include a planar circular disc 122 and a tread portion 124 secured to the circumference of the disc 122. A plurality of hydrofoil blades 126 are rigidly secured to opposite sides of the discs 122 in circumferentially spaced relation and radially inwardly from the treads 124 as shown. When the vehicle body 108 is immersed in water, the resulting water line is shown by the plane WL—WL so that a little more than 50 percent of each of the wheels is below the waterline, thus being generally similar to the modifications shown in FIGS. 9 and 10. Powered rotation of the wheels 118 produce hydrodynamic forces on each of the blades which are effective to propel and lift the vehicle in the water.

The embodiment shown in FIGURES 13–16 includes a buoyant body 130 having pairs of transversely aligned longitudinally spaced wheels 132 secured to rotatable axles 134 extending laterally outwardly from the body 130. The wheels 132 are preferably low pressure bag-type tires which contribute toward buoyancy. A plurality of plates 136 are pivotally connected together to form an endless chain 138 (FIG. 15) that is wrapped around the tread portion of the wheels 132. Hydrodynamic blades 140, similar in shape to the blades 50, are secured to alternate ones of the plates 136 to define a circular circumferentially spaced series of blades 140 as shown in FIGURES 14 and 15. When the vehicle is motionless and floating in water, the water line WL—WL (FIG. 14) is slightly above the axles 134. Rotation of the wheels, in the direction of the arrows on the wheels, causes propulsion of the vehicle in the direction of the arrow R by virtue of the propulsion and lift forces produced by the blades 140 in accordance with the principles described in connection with the blades 50 of the preferred embodiment of FIGS. 1 and 2. In the event the vehicle is loaded to such an extent that the water line is above the wheels, shown by the line WL'—WL', arcuate fences or fenders 142, secured to the body 130 so that they are closely adjacent the periphery of the wheels 132 and the orbit described by the blades 140, may be provided to prevent the water from being carried in orbit of the blades thus effecting flow discontinuity in that region of the wheel periphery traversing the projected area of the fences 142. Thus the blades 140 are unable to produce hydrodynamic forces acting in opposition to the vehicle motion. If desired, fences, similar to fences 142, may be provided with the vehicle shown in FIGS. 9–12.

Referring now to FIGURES 17–19, there is shown another form of vehicle body which has forwardly diverging flow channels initiating from the forward end of the body in order to increase the flow of water and direct the water to the hydrodynamic blades 50. Like numerals designate the same structure shown in FIGURES 1 and 2. In this embodiment each flow channel is formed by outer and inner scoops. The two forward corners of the vehicle are recessed to provide the outer scoops 144. As seen in FIG. 17, wherein one corner of a deck-plate 146 has been broken away, each scoop 144 is defined by a curved plate 147, the upper edge 148 of which extends from an outer forward point 149 to an inner rearward point 150. Since each scoop extends downwardly and rearwardly, its lower end is indicated by the curved dotted line 151. The curved plate 147 is welded between an outer side wall 152 of the vehicle and an inner longitudinal wall 153. Similarly inner scoops 154 that are larger than the scoops 144 and extend to the centerline of the vehicle, are provided near the center of the front of the vehicle. It will be evident therefore that at each side of the vehicle the water will be guided in the direction indicated by the arrows down onto the upper surface of the lower run of each track 36. Not only does the illustrated body shape present the least parasitic resistance to movement in water but it causes the water to flow to and through the blades 50 at a high rate.

Thus as a result of this invention, various vehicle bodies and propulsion means are provided that increase the speed of the vehicle through water and, in the case of crawler propelled vehicles particularly, eliminates the need of propulsion devices that are usable only during movement in water. In addition a new mode of steering crawler propelled vehicles in water is provided.

Instead of providing a chain 138 for each wheel 132, as shown in FIGS. 13–16, two longer endless chains, one for each set of wheels located on each side of the body 130 may be provided, as shown in FIGURE 20, wherein like numerals refer to the same structure shown in FIGS. 13–16. In this embodiment endless chains 138a are constructed of pivotally interconnected plates 136 and include the hydrofoil blades 140. An elongated baffle 142a, similar to the baffle 42a shown in FIGURE 1A, may be provided for the same purpose.

According to this construction, a vehicle is provided which is substantially functionally equivalent to the vehicle of FIGURE 1 but has the added advantage of being supported on pneumatic tires, thus resulting in a more quiet, comfortable operation. In addition, the vehicle of FIGURE 20 provides more lift and propulsion of the vehicle body 130 since a greater number of blades 140 are, at any one time, immersed in water; and, during movement over solid ground, a greater tractive force is exerted by the chain 138a.

While there is in this application specifically described various forms which the invention may assume in practice, it will be understood that the various forms are shown for purposes of illustration only and the invention may be modified and embodied in various other forms without departing from the disclosed principles or the scope of the appended claims.

What I claim as new and desire to secure by Letters Patent is:

1. A crawler chain for propelling a bogie wheel supported vehicle on land and in water comprising a plurality of regularly spaced pivotally connected links; means centrally of said links providing a surface for rollingly engaging the bogie wheels; angularly disposed transversely aligned blade means having their respective inner ends integral with said bogie wheel engaging means; and shroud means on said blade means, said shroud means being oriented generally transverse to the length of said blade means.

2. A crawler chain for propelling a bogie wheel supported vehicle on land and in water comprising a plurality of regularly spaced pivotally connected links; said links having central portions providing a surface for rollingly engaging the bogie wheels, said links having transversely aligned, curved hydrofoil blades having their respective inner ends integral with said central link portions and projecting, laterally from said central portions in opposite directions, said blades also projecting upwardly and rearwardly from said central link portions when the blades are in their lower reach engaging the bogie wheels, said blades being curved to provide generally parallel arcuate surfaces with their concave surfaces facing rearwardly when the links are engaging the bogie wheels.

3. A crawler propelled buoyant vehicle comprising a buoyant body having side and bottom walls, crawler wheels on each side of said vehicle including a plurality of relatively spaced bogie wheels, endless crawler treads mounted on said wheels at the sides of said vehicle; said crawler treads comprising articulated links, each link having a central portion for engaging said wheels and curved hydrofoil blades having their respective inner ends integral with its central link portion, said blades projecting laterally from the central portion of its link; said crawler treads having a path of circulation including a forward, downcoming and rearwardly moving reach; a lower rearwardly moving reach; an upcoming and rearwardly moving reach; and an upper return reach; said blades projecting upwardly and rearwardly when on said lower reach, said blades being curved to provide generally parallel arcuate surfaces with their concave surfaces facing rearwardly when the blades are on said lower reach, said blades being inclined to provide an acute angle of attack relative to the lower reach for inducing water to flow over said blades and imposing substantial lift and propulsion forces on the vehicle.

4. A crawler propelled buoyant vehicle comprising a buoyant body having side and bottom walls, endless crawler treads mounted at the sides of said vehicle; spaced hydrodynamic blades on said crawler treads for inducing water to flow therethrough in a predetermined direction and for imposing forces that lift and propel the vehicle through water; said crawler treads having a path of circulation including a forward, downcoming and rearwardly moving reach; a lower rearwardly moving reach; an upcoming and rearwardly moving reach; and an upper return reach; the blades on said lower reach being rearwardly inclined to the reach by an angle of substantially 45°; the blades on said forward reach being substantially parallel to the lower reach; and the blades on said upcoming and rearwardly moving reach being inclined relative to said lower reach by an angle measured from a rearward prolongation of the lower reach that is substantially 90° or greater, the bottom wall of said vehicle having arcuate longitudinal channels for providing passageways for the lateral flow of water through said blades.

5. The vehicle of claim 4, wherein a pivoted longitudinal plate is mounted on the bottom wall of said vehicle between said channels.

6. The vehicle of claim 4, wherein means are provided on the bottom wall of said vehicle body and associated with each of said crawler treads for directing water to said blades, and means between said water directing means selectively operable to reduce the water flow to either of said crawler treads for reducing the lift and propulsive effort produced by one portion of said lifting and propelling means and thereby effect control of the motion of the vehicle.

7. The vehicle of claim 4, wherein said channels on the bottom wall of said vehicle body are arcuate in cross section and located between said crawler treads, said channels forming passageways extending from the forward to the rearward end of the vehicle.

8. The vehicle of claim 4, wherein a forwardly diverging passageway is formed on each outer side of the front end of the vehicle body in communication with the inlet of said blades for directing water to said blades, said passageways each being formed by downwardly and rearwardly directed plate means secured to the body at opposite sides of each crawler tread.

References Cited by the Examiner

UNITED STATES PATENTS

| 1,635,854 | 7/1927 | Miller | 115—63 |
| 2,278,215 | 3/1942 | Posche | 115—1 |
| 2,680,421 | 6/1954 | Baker. | |
| 2,705,470 | 4/1955 | Baker et al. | |

FOREIGN PATENTS

| 415,640 | 7/1910 | France. |
| 1,105,053 | 6/1955 | France. |

FERGUS S. MIDDLETON, *Primary Examiner.*

ANDREW H. FARRELL, MILTON BUCHLER,
*Examiners.*